Figure 1:
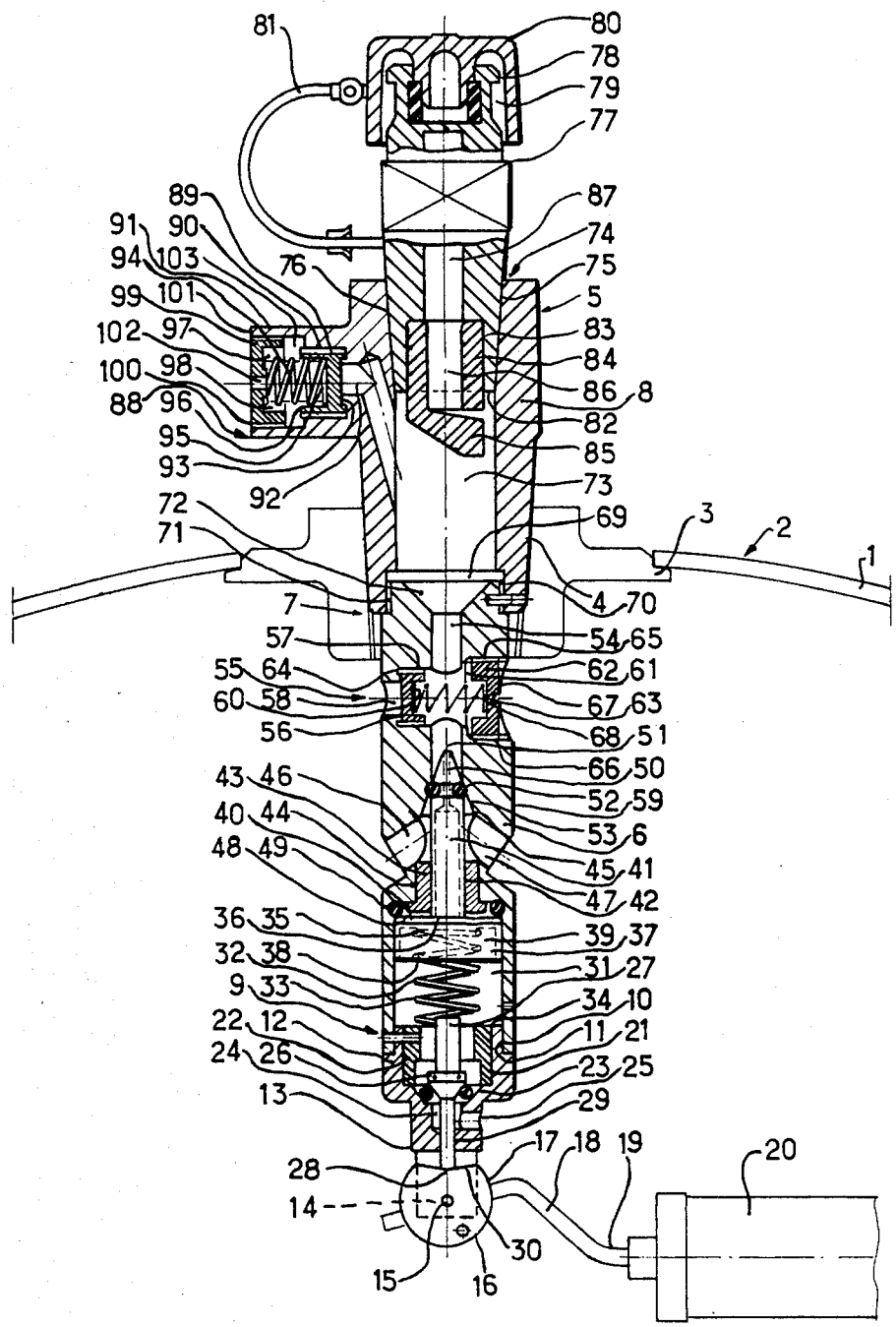

United States Patent [19]

Wendling

[11] Patent Number: 4,510,964
[45] Date of Patent: Apr. 16, 1985

[54] VALVE FOR PRESSURIZED CYLINDERS FOR LIQUIFIED GAS

[76] Inventor: Jean Wendling, 490, Rue Jeanne d'Arc, 67410 Drusenheim (Bas-Rhin), France

[21] Appl. No.: 509,185
[22] Filed: Jun. 29, 1983
[30] Foreign Application Priority Data Feb. 9, 1983 [FR] France ............... 83 02169

[51] Int. Cl.³ ............................................. F04F 5/54
[52] U.S. Cl. ..................................................... 137/210
[58] Field of Search ............... 137/210, 415; 222/4

[56] References Cited

U.S. PATENT DOCUMENTS

| 2,307,115 | 1/1943 | Deibel | 137/210 |
| 2,322,183 | 6/1943 | Ward | 222/14 |
| 4,305,422 | 12/1981 | Bannink | 137/415 |
| 4,423,750 | 1/1984 | Morizumi et al. | 137/210 |
| 4,444,230 | 4/1984 | Van Mullem | 137/415 |

Primary Examiner—Henry C. Yuen
Assistant Examiner—John Kwon
Attorney, Agent, or Firm—Darby & Darby

[57] ABSTRACT

The present invention pertains to a valve for pressurized cylinders for liquified gases, such as butane, propane, and similar gases. This valve is characterized by the combination of: a first safety device which prevents any overfilling of the cylinder with gas in a liquid phase; a mechanism for releasing gas in a gaseous phase which is intended for normal consumption; a flow shut-off device which closes when the flow of gas in a gaseous phase exceeds a predetermined level; and a safety mechanism situated ahead of the shut-off device, according to the direction for releasing gas, the mechanism opening whenever the pressure of gas stored inside the cylinder exceeds the operating pressure.

19 Claims, 1 Drawing Figure

U.S. Patent   Apr. 16, 1985   4,510,964

VALVE FOR PRESSURIZED CYLINDERS FOR LIQUIFIED GAS

The present invention pertains to a valve for pressurized cylinders containing liquified gases, such as butane, propane and similar gases.

Pressurized cylinders for liquified gases wherein the top portion is outfitted with a valve permitting filling of cylinders with liquified gas, as well as discharging of gas in a gaseous phase, have been developed heretofore. This particular valve has an attachment interposed between the cylinder casing and the pressure-release device or tap which permits the line to be opened and/or closed. On one hand, this valve includes an attachment which connects the valve to the cylinder, consisting of a threaded element screwed into a threaded ferrule which is integral with the cylinder, and, on the other hand, the valve includes an attachment which connects the valve to the pressure-release device, with said attachment consisting of a clamping device which only permits opening of the tap after the latter connection has been locked into place.

On account of the characteristics of the gas, safety devices must be provided. One conventional safety device consists of a shut-off device, which closes if the flow at a given moment, for one reason or another, exceeds a predetermined level. Another safety device consists of a safety valve which is intended to operate whenever pressure from gas in a gaseous phase inside the cylinder exceeds the operating pressure. Such an increase in pressure may be caused by an unexpected increase in the ambient temperature, and, in this instance, it is necessary to permit rapid discharging of gas.

However, incompatability exists between these two devices, inasmuch as the former device is intended to block the flow of gas, whereas the latter device is intended to provide an accelerated flow. For this reason, conventional valves are only outfitted with one of the two safety devices which have been cited thus far.

Furthermore, it has been determined that it is necessary to regulate the liquid gas volume during filling of the cylinder. Usually, volume is regulated by means oi devices mounted upon units which supply gas. If these devices do not operate properly, it is only possible to detect difficulties after filling multiple cylinders. Nevertheless, in certain nations, supply systems are not outfitted with any type of control device, and there is a danger of overfilling cylinders, which can result in serious accidents.

The purpose of the present invention is to overcome these problems, and the intent is to provide a valve outfitted with safety devices which permit any danger in terms of accidents to be eliminated.

Accordingly, this invention pertains to a valve for pressurized cylinders for liquified gases, such as butane, propane, or similar gases, characterized by the fact that it is outfitted with a combination comprising: a safety device which prevents any overfilling of cylinders with gas in a liquid phase; a mechanism permitting gas in a gaseous phase to be released when it is intended for ordinary use; a shut-off device which closes whenever the flow of gas in a gaseous phase exceeds a predetermined level; and a safety mechanism placed in front of said shut-off device, according to the direction in which gas is to be released. The latter mechanism opens whenever gas pressure inside the cylinder exceeds the operating pressure.

The advantages which the present invention provides essentially consist of elimination of any risk of accidents, as a result of combining several attachments, specifically:

A float permits closing of the liquid gas inlet whenever a specific volume of liquid gas has been attained inside the cylinder. Hence, overfilling is prevented. It is only possible to make use of such a float as a result of arranging the valve in a specific manner.

The flow shut-off mechanism operates if the flow, at a given moment, exceeds a predetermined quantity of gas in a gaseous phase. Excessive discharging of gas can be caused by breaking of the line beyond the pressure-release device, for example.

The safety mechanism, which can be replaced by a safety plug, opens so as to allow discharging of gas in a gaseous phase whenever the predetermined pressure level inside the cylinder rises, so as to exceed the operating pressure threshold. Nevertheless, in order for this safety valve to function, it is necessary to prevent the shut-off device from blocking the flow. The simultaneous presence of a shut-off device and a safety valve constitutes a significant advantage, especially in terms of safety.

The present invention shall be more fully understood in relation to the subsequent description, which is provided as a presently preferred, but nonetheless illustrative, example embodying the invention, and in relation to the accompanying illustration, wherein:

FIG. 1 is a cut away front view of a valve designed in accordance with the present invention. This particular valve is integral with the upper end of a pressurized liquid gas cylinder.

In relation to FIG. 1, the upper end (2) of the pressurized liquid gas cylinder (1) is outfitted with a ferrule (3) containing a threaded opening (4) and constituting a seat for a valve (5).

In accordance with the present invention, the aforementioned threaded opening (4) provides an outlet for an initial safety device consisting of a plunger (6) placed at the bottom (7) of the chamber (8) for the aforementioned valve (5). A threaded opening (10) is situated at the bottom end (9) of the plunger (6) placed at the bottom (7) of the chamber (8) for the aforementioned valve (5). A threaded opening (10) is situated at the bottom end (9) of the plunger (6), and the threaded portion (11) of a gasket (12) is screwed into said opening. The bottom end (13) of this gasket contains a yoke (14). A linking rod (15) is placed across the arms of the yoke (14), and a cam (16) pivots upon the rod. This cam is integral with one end (17) of a rod (18) whose opposite end (19) is outfitted with a float (20). The previously cited gasket (12) contains a hole (21), where flap (22) has been placed. The aforementioned hole (21) is situated end-to-end with another hole possessing the shape of a truncated cone (23), which is outfitted with a gas seal. The latter hole connects the hole identified as (21) with an intermediate chamber (24) containing at least one hole (25) through which a portion of the gas in a liquid phase shall pass, in order to flow to the interior of the gas cylinder (1).

The hole possessing the shape of a truncated cone (23) constitutes a seat for a valve (26) which is integral with a piston (27) whose bottom end (28), which extends through a hole (29) within the previously cited gasket (12), engages with the edge of the cam (16). This gasket seals a compression chamber (31) situated at the bottom end (9) of the plunger (6), with this end constituting a housing for a flexible component (32). The bottom end (33) of this flexible component (32) rests upon the upper surface (34) of the flap (22), whereas the opposite end (35) rests upon the bottom (36) of a housing (37) provided within the lower surface (38) of a sliding shutter piston (39) situated inside the previously cited compression chamber (31).

The upper surface (40) of the aforementioned shutter piston (39) contains a needle (41) which slides through a hole (42) within a guide (43) which is fitted into a port (44) separating the compression chamber (31) from a duct (45). This duct (45) is connected to the inner portion of the cylinder (1) by means of holes identified as (46) and (47). Sealing is achieved by means of a toroidal seal (49) interposed between the upper surface (40) of the shutter piston (39) and the upper surface of the compression chamber (31). The stem of the previously cited needle (41) contains a hole (50) providing an outlet for the duct (45), on one hand, and for the compression chamber (31), on the other hand.

The upper tip (51) of the needle (41) contains a gas seal (52) which comes into contact with a hole in the form of a truncated cone (53). This hole is situated between the duct (45) and a center opening (54) which extends vertically on both sides of the plunger (6).

This initial safety device functions in the following manner: when a specific volume of gas in a liquid phase is present, the gas lifts the float (2) and therefore causes the cam (16) to turn. As a result, the piston (27) descends and the valve identified as (26) blocks a hole possessing the shape of a truncated cone (23). Liquid gas is then released into the compression chamber (31), thereby pushing the shutter piston (39) upward. The needle (41) then seals another hole possessing the shape of a truncated cone (53), and a liquid gas can no longer enter the cylinder (1) through the holes identified as (46) and (47).

When the gas cylinder is empty or nearly empty, the float (20) descends, thereby causing the cam (16) to turn in the opposite direction. Hence, the cam (16) raises the piston (27), and liquid gas inside the compression chamber (31) flows into the cylinder (1) through the hole identified as (23), through the intermediate chamber (24), and through the flow hole (25). The chamber identified as (31) ceases to be pressurized, and the shutter piston (39) descends. As a result, the needle (41) shall no longer seal the hole identified as (53), which possesses the shape of a truncated cone, and liquid gas, originating from the vertical center opening (54), flows through the holes identified as (46) and (47), expanding within the inner portion of the gas cylinder (1).

Nevertheless, it is also necessary to permit removal of gas in a gaseous phase, even if the liquid gas inlet has been closed.

Accordingly, the previously cited plunger (6) is outfitted with a mechanism for releasing gas in a gaseous phase (55). This mechanism includes a flap (56) which can slide into a horizontal opening (57) situated perpendicular to the vertical center opening (54). As a gas in a gaseous phase flows through a port (58) which, on one hand, extends from the outer circumference (59) of the plunger (6), and, on the other hand, extends into the horizontal opening (57), the gas pushes the flap (56) toward the vertical center opening (54), so as to free this opening. The diameter of the aforementioned port (58) is less than the diameter of the opening identified as (57). Gas therefore flows through the horizontal opening (57) and through the vertical center opening (54), in the direction of the valve (5). The flap identified as (56) is of the flexible return type. For this purpose, a flexible component (63) is interposed between the inner surface (60) of the flap (56) and the inner surface (61) of a plug (62), and this component presses the flap (56) against a shoulder (64) formed as a result of the difference in diameters between the port identified as (56) and the horizontal opening (57). Pressure applied to the flap (56) by the flexible component (63) can be controlled by the plug (62). The outer circumference of the plug contains a threaded portion (65), which can be partially screwed into a threaded opening (66) within the plunger (6), and the center lines of the port (58), the horizontal opening (57), and the latter threaded opening (66) are aligned in the same manner. The outer surface (67) of the aforementioned plug contains a slot (68) for insertion of the tip of a screwdriver or another appropriate tool.

The upper end (69) of the plunger (6) contains a threaded ferrule (70) which is screwed into a threaded hole (71) located at the bottom end (7) of the chamber (8) for the valve (5). By means of a hole (72) which possesses the shape of a truncated conde, the vertical center opening (54) extends into a pre-expansion chamber (73). The upper end (74) of this pre-expansion chamber (73) contains a conical threaded hole (75), with the threaded end (76) of a connecting pipe (77) being screwed into said hole. The upper end (78) of the connecting pipe is outfitted with clamps (79) which permit attachment of a pressure-release device (not shown in the sketch). Within the present sketch, the upper end (78) of the connecting pipe (77) is sealed by a clamped plug (80) which is secured to the connecting pipe by means of a strap (81). In this way, loss of the plug (80) during attachment of the pressure-release is prevented.

The lower edge (82) of the connecting pipe (77) contains a housing (83), and it is possible to drive a flow shut-off device (84) into this housing. The sealing edge (85) of the latter device faces toward the pre-expansion chamber (73). Thus, when the flow of gas in a gaseous phase, at a given moment, exceeds a predetermined level, the sealing edge (85) is pressed against a port (86) within the shut-off device (84), although and extremely limited quantity of gas is permitted to escape in order to provide sufficient suction to maintain the sealing edge (85) in the proper position. On the other hand, when the accidental flow decreases to zero, the sealing edge (85) descends, and the shut-off device (84) opens. The port identified as (86) is situated within the vertical extension of an opening (87) located within the connecting pipe (77), and it therefore provides connection between the pre-expansion chamber (73) and the pressure-release device attached by means of the clamps (79) situated on the connecting pipe (77).

Nevertheless, whenever a specific pressure level for gas in a gaseous phase contained within the cylinder (1) exceeds a normal level, it is necessary to discharge gas rapidly. A pressure increase of this type may be caused by increases in the ambient temperature. If gas under abnormal pressure, which would cause an increased flow rate, were to flow through the shut-off device (84), this device would shut automatically. In order to overcome this problem, the present invention includes a safety mechanism (88) installed beyond the shut-off device (84).

This safety mechanism (88) contains a valve (89) which slides into a housing (90) situated within a fitting (91) which is integral with the chamber (8) for the valve identified as (5). The former valve (89) seals a port (92) which opens into the pre-expansion chamber (73). The diameter of this port (92) is smaller than the diameter of the housing (90), thereby providing a shoulder (93) upon which the valve identified as (89) can rest. This valve is held in place by means of a flexible component (94) with one end (95) which rests upon a surface (96) of the valve (89), whereas the other end (97) rests upon the inner surface (98) of a threaded plug (99) which is crewed into a threaded hole (100) situated within the edge (100) of the previously mentioned fitting (91). The threaded plug (99) contains a discharge hole (102). The flexible component (94) is calibrated in such a manner that the valve identified as (89) shall block the port identified as (92), whenever pressure is the same as the operating pressure. In the event of excessive pressure, the gas shall push back the valve (89) by pressing upon the flexible component (94), so as to pass through the port (92), in order to be released through the discharge hole (102).

According to another version of the present invention, the safety device can consist of a safety plug which seals a hole (103) within the previously cited fitting (91). In the event of increased heat, the safety plug melts, and it is possible for gas to be released.

One of the characteristics of the present invention consists of the fact that the shut-off device (84) and the previously cited safety device (88) are both incorporated within the valve, and such an arrangement is only possible on account of the fact that the former device is placed in front of the latter.

Although the present invention has been described in relation to a specific example, it is obvious that the invention is not, in any sense, restricted to this example, and that it is possible to introduce various modifications in terms of shapes, materials, and combinations for the various components, without thereby departing from the scope and principles of the present invention.

What is claimed is:

1. A valve for a pressurized cylinder for liquified gases, such as butane, propane, and similar gases, comprising in a combination: first safety means for preventing said cylinder from being overfilled with gas in a liquid phase; means for releasing gas in a gaseous phase which is intended for ordinary use; flow shut-off means, which shall close whenever the flow of gas in a gaseous phase exceeds a predetermined level; and second safety means situated ahead of said shut-off means according to the direction in which gas is released, for opening whenever pressure from gas stored within the cylinder exceeds the operating pressure.

2. A valve in accordance with claim 1, wherein the first safety means is a plunger placed at the bottom end of a chamber for the valve and fitted into the said cylinder, the bottom end of said plunger having a float, which, by means of a cam, can engage with a piston, in order to halt the inflow of gas in a liquid phase whenever a predetermined level has been attained within the cylinder.

3. A valve in accordance with claim 2, characterized in that the plunger has a compression chamber with an outlet connected to the piston, outfitted with a valve, which engages within a hole possessing the shape of a truncated cone, which is outfitted with a seal situated within a gasket which is integral with the bottom end of said plunger, whereby the hole which possesses the shape of a truncated cone connects the compression chamber to an intermediate chamber situated within the gasket and connected to the inner portion of the cylinder by at least one flow hole.

4. A valve in accordance with claim 3 comprising a compression chamber having a flexible component interposed between a flap upon the gasket and a shutter piston, with a toroidal seal being interposed between the upper surface of said shutter piston and the upper surface of the compression chamber.

5. A valve in accordance with claim 4, characterized in that the shutter piston is outfitted with a needle, which is integral with the upper surface of said shutter piston and can slide across a hole within a guide which is fitted into a port separating the compression chamber from a duct, the upper tip of said needle having a gas seal which engages with a hole possessing the shape of a truncated cone, which is situated between said duct and a center opening which extends vertically on both sides of said plunger, so as to halt the inflow of gas in a liquid phase.

6. A valve in accordance with claim 5, characterized in that said duct has holes which open into the cylinder, so that gas in a liquid phase shall flow through said holes, into the inner portion of the cylinder, during filling.

7. A valve in accordance with claim 1, characterized in that the means for releasing gas in a gaseous phase includes a flap with a flexible return, which slides within a lengthwise opening which is perpendicular to a vertical center opening.

8. A valve in accordance with claim 7, characterized in that said lengthwise opening extends into the vertical center opening, into a port which connects said lengthwise opening to the inner portion of the cylinder and contains a shoulder capable of supporting said flap, said shoulder being formed as a result of the difference in diameters between the port and the lengthwise opening, with the port possessing the smaller diameter.

9. A valve in accordance with claim 7 or 8, characterized in that the means for releasing includes a flexible component interposed between an inner surface of the flap, for pushing the flap against said shoulder, and the inner surface of a plug which is screwed into a threaded hole situated within the plunger, with the center lines of the port, the horizontal opening, and the threaded hole being aligned, in the same manner.

10. A valve in accordance with claim 1, characterized in that it is outfitted with a connecting pipe, whose upper end has clamps which permit attachment of pressure-release means, the bottom edge of said pipe containing a housing into which a flow shut-off device is driven, with the sealing edge facing the plunger.

11. A valve in accordance with claim 1, characterized in that it has a pre-expansion chamber, whose upper end, into which the shut-off device opens, is integral with the bottom end of the connecting pipe, whereas the bottom end is connected to the vertical center opening for the plunger, by means of a hole possessing the shape of a truncated cone.

12. A valve in accordance with claim 1 or 11, characterized in that the chamber for the valve contains a fitting which constitutes a housing for a safety mechanism, whereby the pre-expansion chamber can be exposed to external air by means of a port.

13. A valve in accordance with claim 12, characterized in that said port opens into the pre-expansion chamber, at a point situated in front of the shut-off device.

14. The valve in accordance with claim 12, characterized in that the safety mechanism includes a valve with a flexible return which can slide within a housing situated within a fitting, with the diameter of said housing being greater than the diameter of the port, so that it shall be possible to provide a shoulder upon which said valve shall rest.

15. A valve in accordance with claim 12, characterized in that the safety mechanism has a calibrated flexible component interposed between one surface of the valve and the inner surface of a threaded plug which is screwed into a threaded hole situated within an edge of said fitting.

16. A valve in accordance with claim 14, characterized in that the safety mechanism has a calibrated flexible component interposed between one surface of the valve and the inner surface of a threaded plug which is screwed into a threaded hole situated within an edge of said fitting.

17. A valve in accordance with claim 15, characterized in that the threaded plug contains a hole for releasing gas in a gaseous phase when pressure exceeds the operating pressure, whereby said gas originating from said port shall push the valve and apply pressure to the calibrated flexible component, so as to escape through this discharge hole.

18. A valve in accordance with claim 16, characterized in that the threaded plug contains a hole for releasing gas in a gaseous phase when pressure exceeds the operating pressure, whereby said gas originating from said port shall push the valve and apply pressure to the calibrated flexible component, so as to escape through this discharge hole.

19. A valve in accordance with claim 12, characterized in that the safety mechanism situated above the shut-off device includes a safety plug which seals an opening for said fitting therein.

* * * * *